(12) United States Patent
Ozaki

(10) Patent No.: US 8,379,314 B2
(45) Date of Patent: Feb. 19, 2013

(54) METHOD FOR DESIGNING IMAGING LENS, AND IMAGING LENS

(75) Inventor: Yuichi Ozaki, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 238 days.

(21) Appl. No.: 12/919,437

(22) PCT Filed: Feb. 4, 2009

(86) PCT No.: PCT/JP2009/051866
§ 371 (c)(1),
(2), (4) Date: Aug. 25, 2010

(87) PCT Pub. No.: WO2009/107466
PCT Pub. Date: Sep. 3, 2009

(65) Prior Publication Data
US 2011/0038060 A1    Feb. 17, 2011

(30) Foreign Application Priority Data

Feb. 29, 2008   (JP) .................. 2008-050515

(51) Int. Cl.
*G02B 3/00* (2006.01)
(52) U.S. Cl. ..................................... 359/652
(58) Field of Classification Search .......... 359/652, 359/708
See application file for complete search history.

(56) References Cited

U.S. PATENT DOCUMENTS 5,759,457 A * 6/1998 Inoue et al. .............. 264/2.5
2005/0210922 A1* 9/2005 Tanaka et al. ............ 65/29.11

FOREIGN PATENT DOCUMENTS

| JP | 2005-173312 | 6/2005 |
| JP | 2005-283783 | 10/2005 |
| JP | 3926380 | 6/2007 |
| JP | 2007-322839 | 12/2007 |
| WO | WO 2007/142100 | 12/2007 |

* cited by examiner

Primary Examiner — Joseph P Martinez
(74) Attorney, Agent, or Firm — Cozen O'Connor

(57) ABSTRACT

Provided is a method for designing an image pickup lens which is low cost and applicable to reflow process. The method includes a step of designing the image pickup lens including a lens formed of energy curable resin, on the assumption that the energy curable resin is homogeneous; a step of obtaining an image pickup lens by manufacturing each lens forming the image pickup lens, based on the design; a step of evaluating lens performance of the obtained image pickup lens; a step of designing the image pickup lens again by changing surface shape of at least one surface and/or lens-surface distance in at least one place in the image pickup lens, based on the lens performance obtained by an simulation in the designing step and the lens performance of the image pickup lens obtained in the evaluating step.

8 Claims, 10 Drawing Sheets

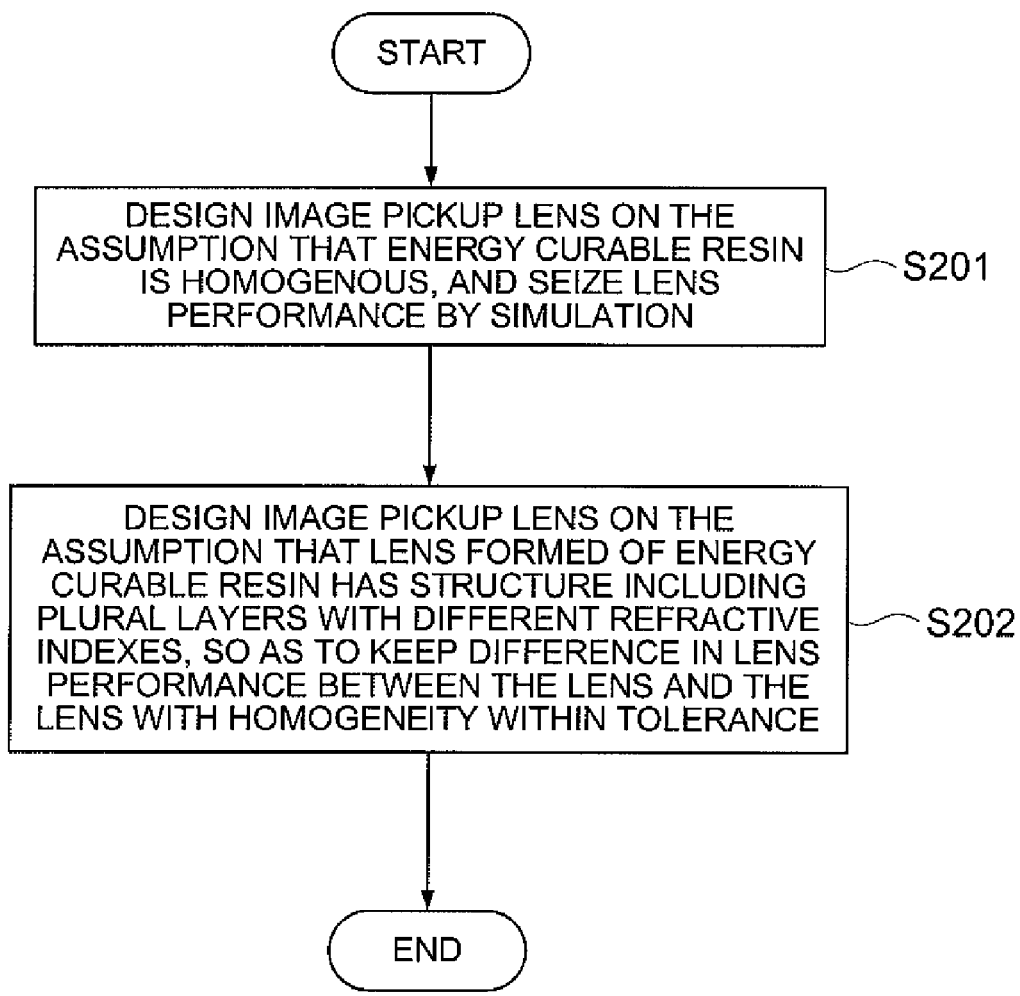

METHOD FOR DESIGNING IMAGING LENS, AND IMAGING LENS

RELATED APPLICATIONS

This is a U.S. National Phase Application under 35 U.S.C. 371 of International Application No. PCT/JP2009/051866, filed on Feb. 4, 2009.

This application claims the priority of Japanese application no. 2008-050515 filed Feb. 29, 2008, the entire content of which is hereby incorporated by reference.

TECHNICAL FIELD

The present invention relates to an image pickup lens of an image pickup apparatus employing a solid-state image pickup element such as an image sensor of CCD (Charge Coupled Devices) type and an image sensor of CMOS (Complementary Metal-Oxide Semiconductor) type. More particularly, it relates to an image pickup lens employing a lens suitable for mass-production and a method for designing the image pickup lens.

BACKGROUND ART

A compact image pickup apparatus presently has come to be mounted on a mobile terminal such as a cell phone and PDA (Personal Digital Assistant). An image pickup apparatus is in the actual circumstances that mass-productivity of an image pickup apparatus to be mounted on a mobile terminal is demanded according to a recent spread of a large amount of mobile terminals and that further downsizing and cost reduction of an image pickup apparatus are demanded according to a demand of further reduction in size and thickness of a mobile terminal from users.

As a method to mount a large number of image pickup apparatuses at low cost, the following technique has been suggested recently. Optical elements are arranged together with electronic components such as IC chip on a substrate on which solder is potted in advance. By adding reflow processing (heating processing) to the substrate to melt the solder as the optical elements and electronic components are arranged thereon, the optical elements and electronic components are simultaneously mounted on the substrate.

On the other hand, for reducing the cost of an image pickup apparatus, many types of inexpensive thermoplastic resin has been used as a material forming an image pickup lens. In order to mount the image pickup apparatus with the above reflow processing, optical elements need to be heated with electronic components at about 200 to 260 degrees. However, lenses made of thermoplastic resin can be deformed by heat or changed in color under such the high temperature, which results in deterioration of its optical performance. As a solution of the problem, there has been known an image pickup lens employing a glass mold lens which is excellent in heat resistance (for example, refer to Patent Literature 1).

Patent literature 1: JP-A No. 2007-322839

DISCLOSURE OF THE INVENTION

Problems to be Solved by the Invention

By employing a glass mold lens, the optical performance can be maintained even when the lens is exposed in a high temperature during the reflow processing, but the cost is higher than that of a lens made of thermoplastic resin, which causes a problem that a glass mold lens does not meet the demand about the cost reduction of an image pickup apparatus.

On the other hand, as a method to solve such the problem, there has been proposed a method in which a lens formed of thermosetting resin which is hardened by heat is employed to realize a compatibility of reducing cost and maintaining optical performance under a high-temperature environment. When a lens formed of thermosetting resin as one of energy curable resins, is molded, thermosetting resin material in a liquid state is injected into a heated mold and is hardened by heat in the mold. Since the peripheral portion facing the heated mold is hardened by heat more quickly than the central portion of the lens, uneven distribution of density is caused inside the thermosetting resin, which can make unevenness of refractive index inside the lens after the resin is hardened.

To solve the above, the present inventors prepared a molded body in plate shape with a thickness of about 2 mm by molding thermosetting resin as shown in FIG. 1, and measured the refractive index of the molded body in the "optical axis direction" of the molded body (in the cross-sectional direction of the molded body). From the measurement, it has been found that the refractive index in the optical axis direction of the molded body has two peaks at a portion around the surface and a portion around the center as shown in FIG. 2, and that layers with different diffractive indexes are formed.

Such a lens formed of thermosetting resin, in which layers with different refractive indexes are formed, is no longer considered as a single lens formed of a single material and exhibits an optical property which is similar to a cemented lens formed with adhered resin materials with different refractive indexes. This fact brings an optical performance which is different from that of the original design as a primary cause, and the lens can hardly exhibit a desired performance as an image pickup lens. Further, the similar problem possibly exists in UV curable resin being one of energy curable resins.

Therefore, an object of the present invention is to provide an image pickup lens which is inexpensive and applicable to the reflow processing and a method for designing the image pickup lens, by correcting a difference in optical property coming from an influence of an uneven refractive index due to a use of energy curable resin.

Solution to Problem

A designing method of an image pickup lens descried in Item 1 is a method for designing an image pickup lens including at least one lens formed of energy curable resin and provided for forming a subject image on a photoelectric conversion section of a solid-state image pickup element. The method comprises the steps of: designing an image pickup lens on an assumption that the energy curable resin is homogenous; obtaining an image pickup lens by manufacturing each of lens or lenses forming the image pickup lens, based on the design; evaluating a lens performance of the obtained image pickup lens; and designing the image pickup lens again by changing a surface shape of at least one surface of the image pickup lens and/or a lens-surface distance in at least one place, based on a lens performance obtained by a simulation in the step of designing the image pickup lens and the lens performance of the image pickup lens obtained in the step of evaluating the lens performance.

Item 1 provides a method for designing an image pickup lens in which a deterioration of optical performance coming from non-homogeneity of energy curable resin is corrected. A lens performance obtained by a simulation of an image pickup lens which is designed on the assumption that an energy curable resin is homogeneous, and a lens performance of an actual image pickup lens obtained by the design, are compared and studied, and the image pickup lens is designed again in terms of surface shape or lens-surface distance based on the results. Thereby, an image pickup lens in which a deterioration of the optical property coming from the non-homogeneity of the curable resin is corrected in excellent condition can be designed.

A designing method of an image pickup lens descried in Item 2 is a method for designing an image pickup lens including at least one lens formed of energy curable resin and provided for forming a subject image on a photoelectric conversion section of a solid-state image pickup element. The method comprises the steps of: assuming that the lens formed of the energy curable resin is a lens having a structure including a plurality of layers whose refractive indexes are different from each other because of non-homogeneity of the energy curable resin, and designing a shape of at least one surface of the image pickup lens and/or a lens-surface distance in at least one place of the image pickup lens, based on a comparison between the assumed lens and a lens having a same shape to the lens formed of the energy curable resin and having a homogenous refractive index.

Item 2 provides a method for designing an image pickup lens in which non-homogeneity of energy curable resin is considered in advance. Based on a difference in refractive index between at the lens surface and at the central portion of the lens coming from the non-homogeneity of energy curable resin, the lens surface and the central portion of the lens are considered as layers with different refractive indexes, and an image pickup lens is designed on the assumption that the image pickup lens includes a lens having a structure including a plurality of layers. Thereby, there is no need to manufacture and measure an actual lens and to carry out a feed-back correction of its shape based on the measurement result, which allows an effective design of an image pickup lens in which an influence to an optical performance coming from the non-homogeneity of refractive index of energy curable resin is reduced.

An image pickup apparatus of Item 3 is an image pickup lens for forming a subject image on a photoelectrical converting section of a solid-state image pickup element. The image pickup lens comprises: at least one lens formed of an energy curable resin. In the image pickup lens, a deterioration of a lens performance caused because of non-homogeneity of the energy curable resin, is corrected by adjusting a shape of at least one surface in the image pickup lens and/or by adjusting a lens-surface distance in at least one place of the image pickup lens.

The term "performance" used in the description means values of parameters such as a focal length of a total system of the image pickup lens, back focus, aberrations, and incident angle to a sensor. The term "energy curable resin" means any of energy curable resins including thermosetting resin and UV-curable resin.

In the present invention, energy curable resin is used as a material of the image pickup lens. In the image pickup lens, deterioration of the optical performance caused when the lens is exposed to high temperature is smaller than that of lenses made of thermoplastic resin such as polycarbonate resin and polyolefin resin. Therefore, the image pickup lens is effective for a reflow processing, and is manufactured more easily and more inexpensive than glass mold lens, which realizes a compatibility of a reduced cost and mass-productivity of an image pickup apparatus in which an image pickup lens of the present invention is mounted.

As described above with referring to FIG. 2, it has been found from the measurement of the present inventors that an image pickup lens employing energy curable resin, has a refractive index difference between the refractive index of an outer layer portion of the lens and the refractive index of an central portion (inner portion) of the lens coming from non-homogeneity of the curable resin. The refractive index difference causes a difference in optical performance from an image pickup lens designed on the assumption of homogeneous material. Therefore, in the present invention, the influence is controlled by a correction carried out by adjusting a surface shape or lens-surface distance of an image pickup lens, to reduce or eliminate the difference in optical performance. In the description, the term "lens-surface distance" means a distance between lens surfaces, and also means a distance between a lens surface and an image pickup plane.

The term "correction" used in the description means to adjust a surface shape of at least one surface or a lens-surface distance in the image pickup lens so as to bring an optical performance of an image pickup lens employing a lens with the distribution of refractive index closer to or over an optical performance of an image pickup lens employing a lens without the distribution of refractive index. The term does not necessarily mean that the optical performances completely agree with each other.

As for an image pickup lens of Item 4, according to the image pickup lens of Item 3, the lens formed of the energy curable resin has a thickness along an optical axis being 1 mm or less.

Item 4 provides thickness along the optical axis of the lens employing energy curable resin. In general, an image pickup lens employing energy curable resin exhibits greater change in refractive index due to water absorption caused when the lens is exposed in an environment of high humidity, compared with thermoplastic resin, which causes refractive index difference corresponding to difference in quantity of water absorption between the central portion and the surface portion of the lens in the middle of the water absorbing process and further causes non-homogeneity of optical performance. Therefore, the lens is more greatly affected by the water absorption than the lens employing thermoplastic resin. When the thickness of the lens is set to 1 mm or less, the difference in water absorption between the central portion and the surface portion of the lens becomes small, and the non-homogeneity of optical performance due to the water absorption is effectively controlled even when a curable resin is employed. Further, when the thickness along the optical axis of the lens satisfies the range which is 0.2 mm or more and is 0.8 mm or less, a compatibility of difficulty of lens manufacturing and keeping the optical performance is realized, which leads to a preferable result.

In an image pickup lens descried in claim 5, according to the invention described in Item 3 or 4, the non-homogeneity of the energy curable resin is non-homogeneity in a refractive index.

Effects of the Invention

According to the invention, a difference in optical performance due to an influence of unevenness of refractive index caused by employing curable resin can be corrected. Thereby, an image pickup lens which is inexpensive and applicable to a reflow processing, and a method for designing the image pickup lens can be provided.

BRIEF DESCRIPTION OF DRAWINGS

FIG. 13 is a flow chart for illustrating a method of designing a lens.

REFERENCE SIGNS LIST

S Aperture stop
L Image pickup lens
F Parallel flat plate
IS Image pickup plane (Photoelectric converting section of solid-state image pickup element)

BEST MODE FOR CARRYING OUT THE INVENTION

Examples suitable to carry out the present invention will be described below. However, the scope of the invention is not limited to the examples described below. Symbols used in the examples are as follows.

$n_1$: Refractive index at d line around an outer-layer portion of a lens molded with curable resin
$n_2$: Refractive index at d line around an inner portion of the lens molded with curable resin
f: Focal length of the total system of the image pickup lens
fB: Back focus
F: F number
2Y: Diagonal length of image plane
r: Paraxial curvature radius of lens surface
D: Surface distance of lens
Nd: Refractive index of lens at d line
vd: Abbe number of lens at d line
ENTP: Entrance pupil position (Distance from the first lens-surface to entrance pupil position)
EXTP: Emergence pupil position (Distance from the image pickup plane to the emergence pupil position)
H1: Object-side principal point position (Distance from the first lens-surface to object-side principal point position)
H2: Image-side principal point position (Distance from the last lens-surface to image-side principal point position)

A shape of an aspheric surface in the present invention is defined as follows. That is, assuming that x is a distance (sag amount) along the optical axis from a tangential plane of the surface apex, y is a height from the optical axis, r is a paraxial curvature radius, K is a conic constant, and $A_n$ (=4, 6, 8, ..., 20) is an n-th order aspheric surface constant, x is represented by the following Expression 1.

$$x = \frac{y^2/r}{1+\sqrt{1-(1+K)y^2/r^2}} + \sum A_n y^n \quad \text{[Expression 1]}$$

Figure 1:
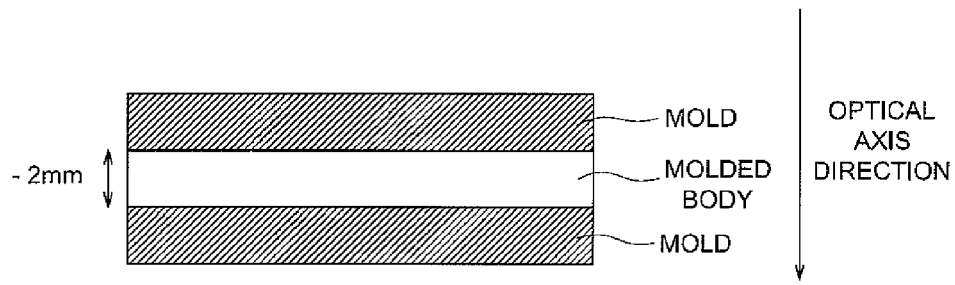
FIG. 1 is a diagram for schematically illustrating a molding method of molding a parallel flat plate with thermosetting resin.
Figure 2:
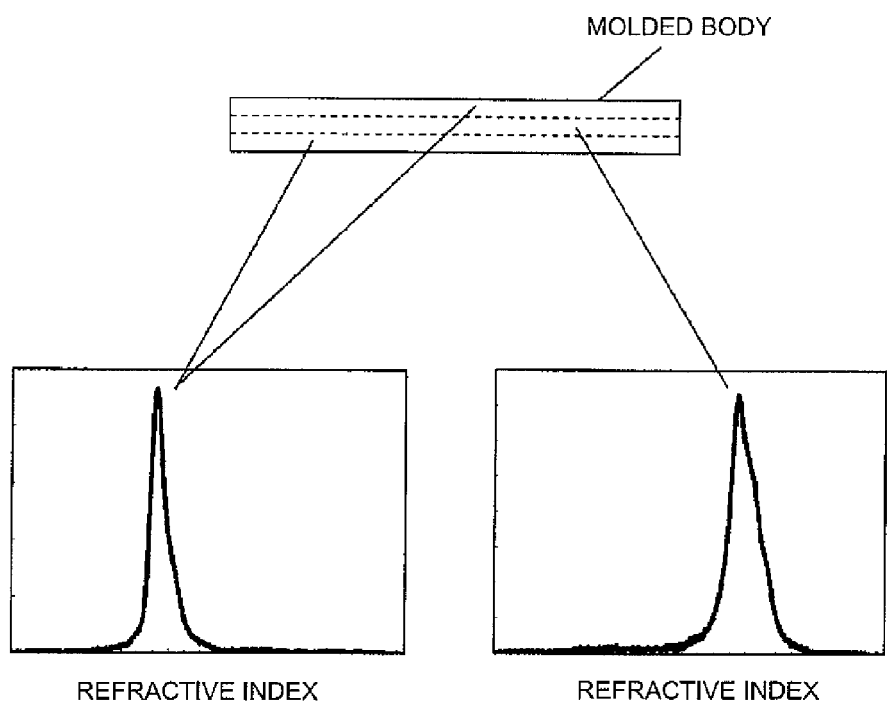
FIG. 2 is a diagram for schematically illustrating a condition that the parallel flat plate molded with thermosetting resin has a structure of resin layers with different refractive indexes.
Figure 3:
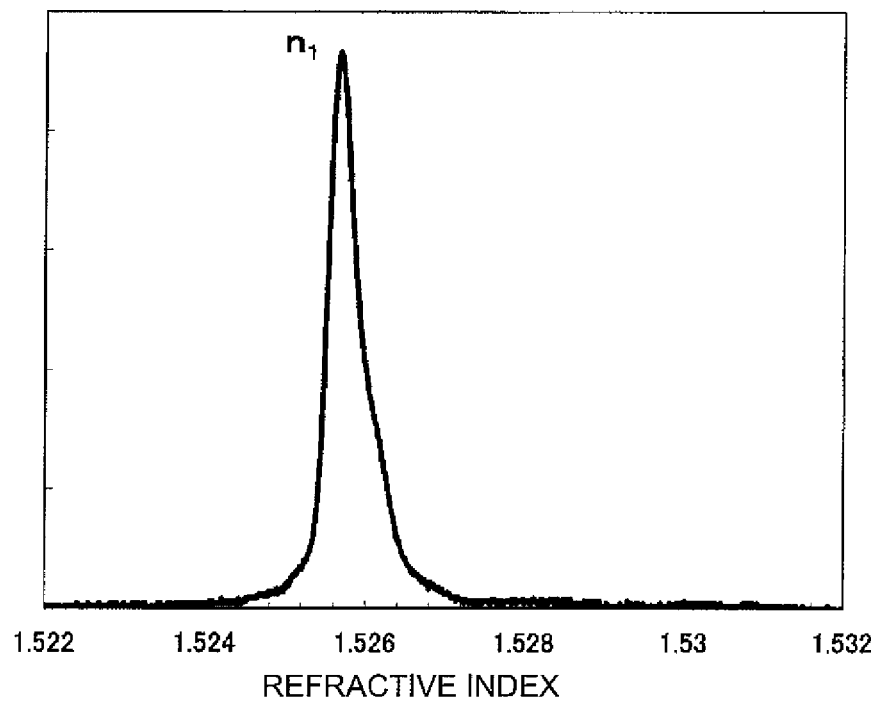
FIG. 3 is a diagram schematically showing a profile of refractive index (showing a relationship of refractive index and intensity) around the surface of the thermosetting resin employed in the present invention.
Figure 4:
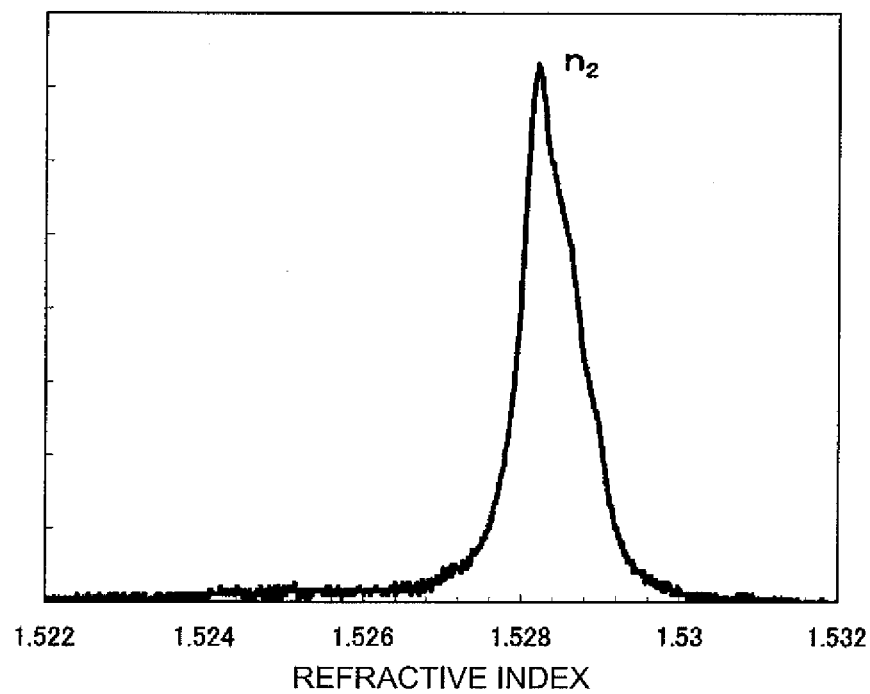
FIG. 4 is a diagram schematically showing a profile of refractive index (showing a relationship of refractive index and intensity) around the center of the thermosetting resin employed in the present invention.

Thermosetting resin employed in the present invention is thermosetting resin which was prepared by adding 1 wt % of PERBUTYL O made by NOF CORPORATION as polymerization initiator to NK ESTER DCP (Tricyclodecane dimethanol Dimethacrylate) made by Shin-Nakamura Chemical Co., Ltd. The thermosetting resin was hardened at 150° C. for 10 minutes to be molded. As a measuring apparatus of refractive index, KPR-200 made by SHIMADZU CORPORATION was employed. Refractive index was measured with a V-block method, and a parallel flat plate with a thickness of 1.8 mm was measured with its side surfaces held with a V block prism. Since it was previously found that refractive index was uneven and had two peaks, an incident beam was narrowed with a slit when the refractive index was measured, and refractive index distribution in a thickness direction of the parallel flat plate was measured. As a result, it was found that areas with different refractive indexes in a surface portion and central portion of the parallel flat plate formed a layered structure. As for refractive index profile (relationship of refractive index and intensity) in the parallel flat plate, FIG. 3 schematically shows the refractive index around the surface and FIG. 4 schematically shows the refractive index around the central portion. Both figures show that positions of peaks of the curves (each of which represents refractive index at a measured portion) are different from each other. Measurement results of refractive index in the thickness direction of the parallel flat plate are listed in Table 1. In the following example, values of Table 1 were used.

TABLE 1

| Thickness direction | Nd | vd | Thickness |
|---|---|---|---|
| Surface portion | 1.52568(=$n_1$) | 53.8 | 0.6 mm |
| Central portion | 1.52820(=$n_2$) | 53.8 | 0.6 mm |
| Surface portion | 1.52568(=$n_1$) | 53.8 | 0.6 mm |

Comparative Example 1

Table 2 shows lens data of a single lens under the assumption that the thermosetting resin is a homogeneous resin with refractive index $n_1$, as Comparative Example 1. An image pickup element had the following specification: 1/7 inch type, 3.2 μm pixel pitch, 640×480 pixels. A distance between the surface closest to the image and the image pickup element was defined as a best focus distance along the optical axis of MTF (Modulation Transfer Function) when spatial frequency is set to 78 lines/mm, and the wavelength ratio "d-line:F-line:C-line" is set to 1:1:1. In the following description (including lens data in Tables), an exponent for 10 is assumed to be expressed by using "e" (for example, $2.5 \times 10^{-03}$ is expressed by 2.5e-03).

TABLE 2 f = 1.811 mm  fB = 0.413 mm  F = 3.29  2Y = 2.56 mm
ENTP = 0 mm  EXTP = −2.26 mm  H1 = −0.58 mm  H2 = −1.4 mm

| Surface No. | r(mm) | D(mm) | Nd | vd | Effective radius (mm) |
|---|---|---|---|---|---|
| 1 (Stop) | ∞ | 0.2800 | | | 0.275 |
| 2* | 1.3999 | 1.0700 | 1.52568 | 53.8 | 0.603 |

TABLE 2-continued f = 1.811 mm fB = 0.413 mm F = 3.29 2Y = 2.56 mm
ENTP = 0 mm EXTP = −2.26 mm H1 = −0.58 mm H2 = −1.4 mm

| | | | | | |
|---|---|---|---|---|---|
| 3* | −2.1934 | 0.7286 | | | 0.717 |
| 4 | ∞ | 0.3000 | 1.51680 | 64.2 | 1.067 |
| 5 | ∞ | 0.3000 | | | 1.156 |

Aspheric surface coefficient

| $2^{nd}$ surface | | $3^{rd}$ surface | |
|---|---|---|---|
| K = | −7.3245e−01 | K = | −1.0533e+01 |
| A4 = | 6.5940e−01 | A4 = | 1.2419e−01 |
| A6 = | −3.9514e+00 | A6 = | 6.6186e−01 |
| A8 = | 1.4404e+01 | A8 = | −7.2198e−01 |
| A10 = | −2.5725e+01 | A10 = | 1.0995e−01 |
| A12 = | 1.7685e+01 | A12 = | 6.2103e−01 |

Figure 5:
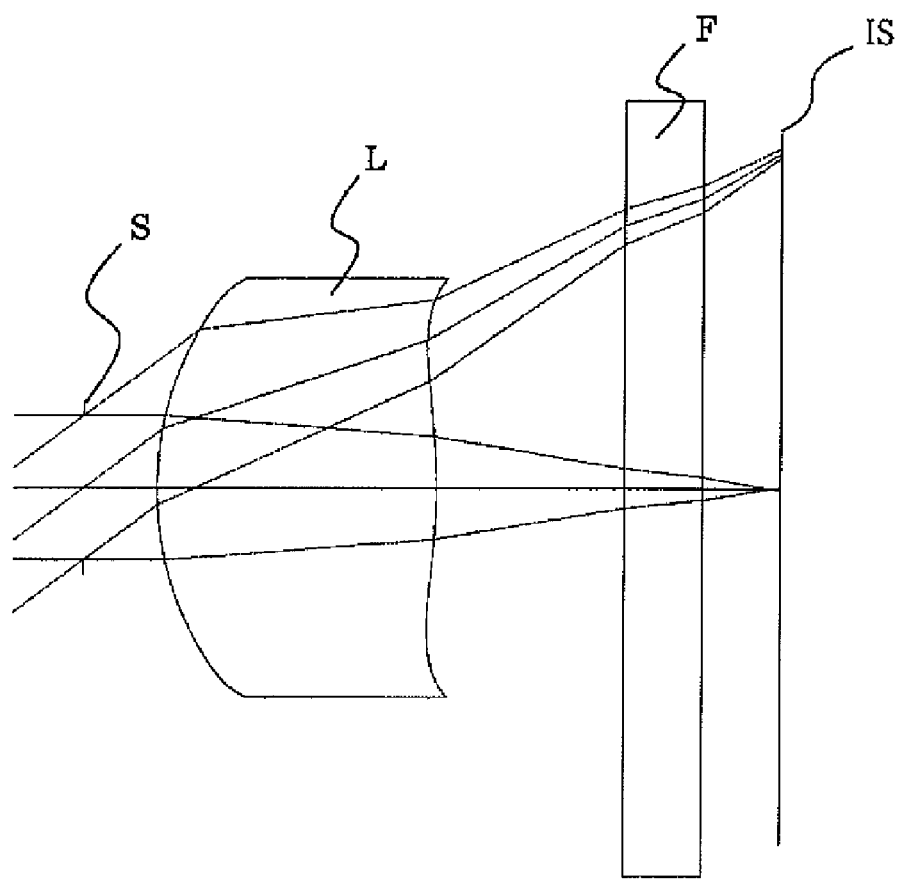
FIG. 5 is a cross-sectional view of Comparative Example 1.

FIG. 5 shows a cross-sectional view of the image pickup lens shown in Comparative Example 1. In the figure, S represents an aperture stop, L represents an image pickup lens, F represents a parallel flat plate assuming an optical low-pass filter, IR-cut filter, sealing glass of a sold-state image pickup element, and IS represents an image pickup plane (photoelectric converting section) of a solid-state image pickup element (which are the same in the following cross-sectional views). First Example and Second Example are aimed to bring their optical performance close to the optical performance of Comparative Example 1.

Comparative Example 2

Table 3 shows lens data under a condition that refractive index difference is caused inside the lens of the Comparative Example 1 and a lens with refractive index $n_2$ exists therein. The lens was calculated by fitting with the Expression 1 under the condition that the surface closest to the object and the surface closest to the image in the outer layer portions had the same lens shapes as those of Comparative Example 1, the lens shape of the central portion (inner portion) had a one-third thickness along the optical axis of that of the lens in Comparative Example 1, and its surface shape satisfied the ratio "thickness of the outer layer portion":"thickness of the central portion (inner portion)":"thickness of the outer layer portion" to be 1:1:1 at every optical axis height y based on the surface shape of the opposing surfaces of the outer layer portions as a basis. In the present Comparative Example and the following examples, shapes of boundary surfaces were calculated by fitting about an aspheric surface with higher order aspheric coefficients based on the Expression 1. However, it is enough to define the boundary surfaces based on only the variable r or to define the boundary surfaces on the assumption that they are planes perpendicular to the optical axis, instead of using the higher order aspheric surface coefficients.

TABLE 3 f = 1.809 mm fB = 0.411 mm F = 3.29 2Y = 2.56 mm
ENTP = 0 mm EXTP = −2.26 mm H1 = −0.58 mm H2 = −1.4 mm

| Surface No. | r(mm) | D(mm) | Nd | vd | Effective radius (mm) |
|---|---|---|---|---|---|
| 1 (Stop) | ∞ | 0.2800 | | | 0.275 |
| 2* | 1.3999 | 0.3566 | 1.52568 | 53.8 | 0.603 |
| 3* | 3.0742 | 0.3566 | 1.52820 | 53.8 | 0.642 |
| 4* | −15.0380 | 0.3566 | 1.52568 | 53.8 | 0.680 |
| 5* | −2.1934 | 0.7286 | | | 0.717 |

TABLE 3-continued f = 1.809 mm fB = 0.411 mm F = 3.29 2Y = 2.56 mm
ENTP = 0 mm EXTP = −2.26 mm H1 = −0.58 mm H2 = −1.4 mm

| | | | | | |
|---|---|---|---|---|---|
| 6 | ∞ | 0.3000 | 1.51680 | 64.2 | 1.067 |
| 7 | ∞ | 0.3000 | | | 1.155 |

Aspheric surface coefficient

| $2^{nd}$ surface | | $4^{th}$ surface | |
|---|---|---|---|
| K = | −7.3245e−01 | K = | −2.4589e+03 |
| A4 = | 6.5940e−01 | A4 = | 3.0695e−01 |
| A6 = | −3.9514e+00 | A6 = | −7.2894e−01 |
| A8 = | 1.4404e+01 | A8 = | 3.9570e+00 |
| A10 = | −2.5725e+01 | A10 = | −8.0789e+00 |
| A12 = | 1.7685e+01 | A12 = | 6.1148e+00 |
| $3^{rd}$ surface | | $5^{th}$ surface | |
| K = | 1.0658e+01 | K = | −1.0533e+01 |
| A4 = | 4.6303e−01 | A4 = | 1.2419e−01 |
| A6 = | −2.3631e+00 | A6 = | 6.6186e−01 |
| A8 = | 8.9265e+00 | A8 = | −7.2198e−01 |
| A10 = | −1.6361e+01 | A10 = | 1.0995e−01 |
| A12 = | 1.1426e+01 | A12 = | 6.2103e−01 |

Figure 6:
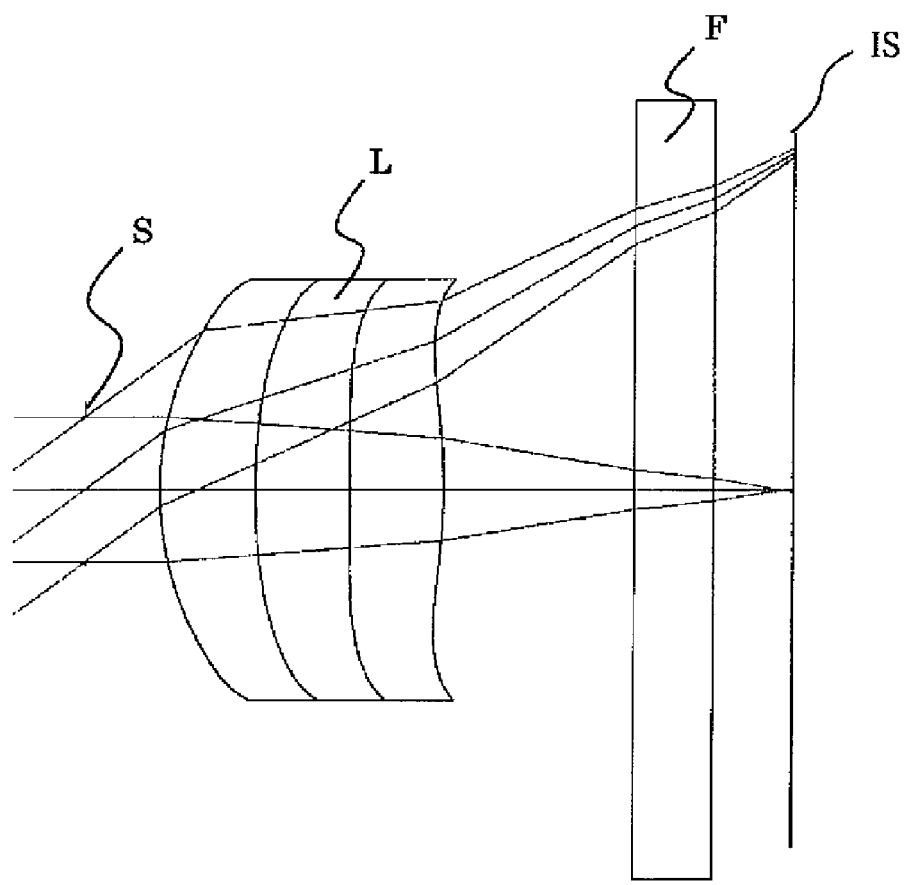
FIG. 6 is a cross-sectional view of Comparative Example 2.

FIG. 6 shows a cross-sectional view of the image pickup lens shown in Comparative Example 2. Comparative Example 2 provides an image pickup lens which is an assumed object of comparison in the design method of claim 1. The following First Example and Second Example were designed by carrying out a correction based on simulation data of Comparative Example 1 and Comparative Example 2.

First Example

Table 4 shows lens data provided by changing curvature radiuses of the surface closest to the object (the second surface) and the surface closest to the image (the fifth surface) in lens data of Comparative Example 2, as First Example. Thickness along the optical axis of each surface was assumed to be the same as that in Comparative Example 2. The surface shape of each of the third surface and the fourth surface was calculated by fitting with Expression 1 so as to satisfy the ratio "thickness of the surface portion":"thickness of the center portion":"thickness of the surface portion" is 1:1:1 at every optical axis height y based on surface shapes of the second surface and the fifth surface as a basis, similarly to Comparative Example 2. Generally, when refractive index of the inner layer is higher than that of the outer layer, the focal length becomes shorter. Therefore, it is preferable that the curvature radius of the optical surface is set to be gentle, but the scope of the invention is not limited to that.

TABLE 4 f = 1.811 mm fB = 0.413 mm F = 3.29 2Y = 2.56 mm
ENTP = 0 mm EXTP = −2.26 mm H1 = −0.58 mm H2 = −1.4 mm

| Surface No. | r(mm) | D(mm) | Nd | vd | Effective radius (mm) |
|---|---|---|---|---|---|
| 1 (Stop) | ∞ | 0.2800 | | | 0.275 |
| 2* | 1.4023 | 0.3566 | 1.52568 | 53.8 | 0.603 |
| 3* | 3.0795 | 0.3566 | 1.52820 | 53.8 | 0.642 |
| 4* | −15.0900 | 0.3566 | 1.52568 | 53.8 | 0.680 |
| 5* | −2.1972 | 0.7286 | | | 0.717 |

TABLE 4-continued f = 1.811 mm fB = 0.413 mm F = 3.29 2Y = 2.56 mm
ENTP = 0 mm EXTP = −2.26 mm H1 = −0.58 mm H2 = −1.4 mm

| 6 | ∞ | 0.3000 | 1.51680 | 64.2 | 1.067 |
| 7 | ∞ | 0.3000 | | | 1.155 |

Aspheric surface coefficient

| $2^{nd}$ surface | | $4^{th}$ surface | |
|---|---|---|---|
| K = | −7.3245e−01 | K = | −2.2771e+03 |
| A4 = | 6.5940e−01 | A4 = | 3.1124e−01 |
| A6 = | −3.9514e+00 | A6 = | −7.4933e−01 |
| A8 = | 1.4404e+01 | A8 = | 4.0056e+00 |
| A10 = | −2.5725e+01 | A10 = | −8.1370e+00 |
| A12 = | 1.7685e+01 | A12 = | 6.1422e+00 |
| $3^{rd}$ surface | | $5^{th}$ surface | |
| K = | 1.0699e+01 | K = | −1.0533e+01 |
| A4 = | 4.6287e−01 | A4 = | 1.2419e−01 |
| A6 = | −2.3628e+00 | A6 = | 6.6186e−01 |
| A8 = | 8.9263e+00 | A8 = | −7.2198e−01 |
| A10 = | −1.6361e+01 | A10 = | 1.0995e−01 |
| A12 = | 1.1427e+01 | A12 = | 6.2103e−01 |

Figure 7:
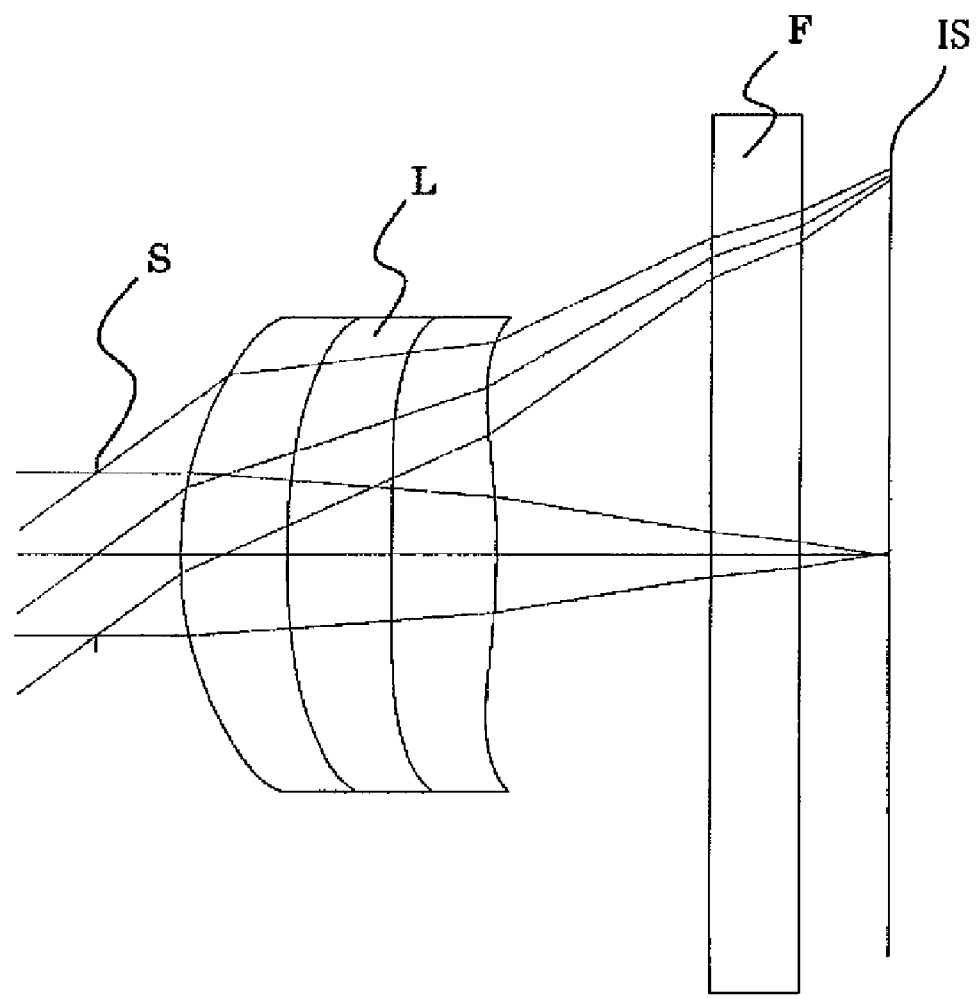
FIG. 7 is a cross-sectional view of First Example.

In First Example, surface shape of the lens was corrected in order to enhance the optical performance of Comparative Example 2 and to bring the optical performance close to that of Comparative Example 1. FIG. 7 shows a cross-sectional view of the image pickup lens shown in First Example.

Second Example

Table 5 shows lens data provided by changing surface distance between the image pickup lens and parallel flat plate in lens data of Comparative Example 2, as Second Example. Surface shapes of the image pickup lens was defined as the same as Comparative Example 2.

TABLE 5 f = 1.809 mm fB = 0.411 mm F = 3.29 2Y = 2.56 mm
ENTP = 0 mm EXTP = −2.26 mm H1 = −0.58 mm H2 = −1.4 mm

| Surface No. | r(mm) | D(mm) | Nd | vd | Effective radius (mm) |
|---|---|---|---|---|---|
| 1 (Stop) | ∞ | 0.2800 | | | 0.275 |
| 2* | 1.3999 | 0.3566 | 1.52568 | 53.8 | 0.604 |
| 3* | 3.0742 | 0.3566 | 1.52820 | 53.8 | 0.643 |
| 4* | −15.0380 | 0.3566 | 1.52568 | 53.8 | 0.680 |
| 5* | −2.1934 | 0.7262 | | | 0.717 |
| 6 | ∞ | 0.3000 | 1.51680 | 64.2 | 1.067 |
| 7 | ∞ | 0.3000 | | | 1.155 |

Aspheric surface coefficient

| $2^{nd}$ surface | | $4^{th}$ surface | |
|---|---|---|---|
| K = | −7.3245e−01 | K = | −2.4589e+03 |
| A4 = | 6.5940e−01 | A4 = | 3.0695e−01 |
| A6 = | −3.9514e+00 | A6 = | −7.2894e−01 |
| A8 = | 1.4404e+01 | A8 = | 3.9570e+00 |
| A10 = | −2.5725e+01 | A10 = | −8.0789e+00 |
| A12 = | 1.7685e+01 | A12 = | 6.1148e+00 |
| $3^{rd}$ surface | | $5^{th}$ surface | |
| K = | 1.0658e+01 | K = | −1.0533e+01 |
| A4 = | 4.6303e−01 | A4 = | 1.2419e−01 |
| A6 = | −2.3631e+00 | A6 = | 6.6186e−01 |
| A8 = | 8.9265e+00 | A8 = | −7.2198e−01 |
| A10 = | −1.6361e+01 | A10 = | 1.0995e−01 |
| A12 = | 1.1426e+01 | A12 = | 6.2103e−01 |

Figure 8:
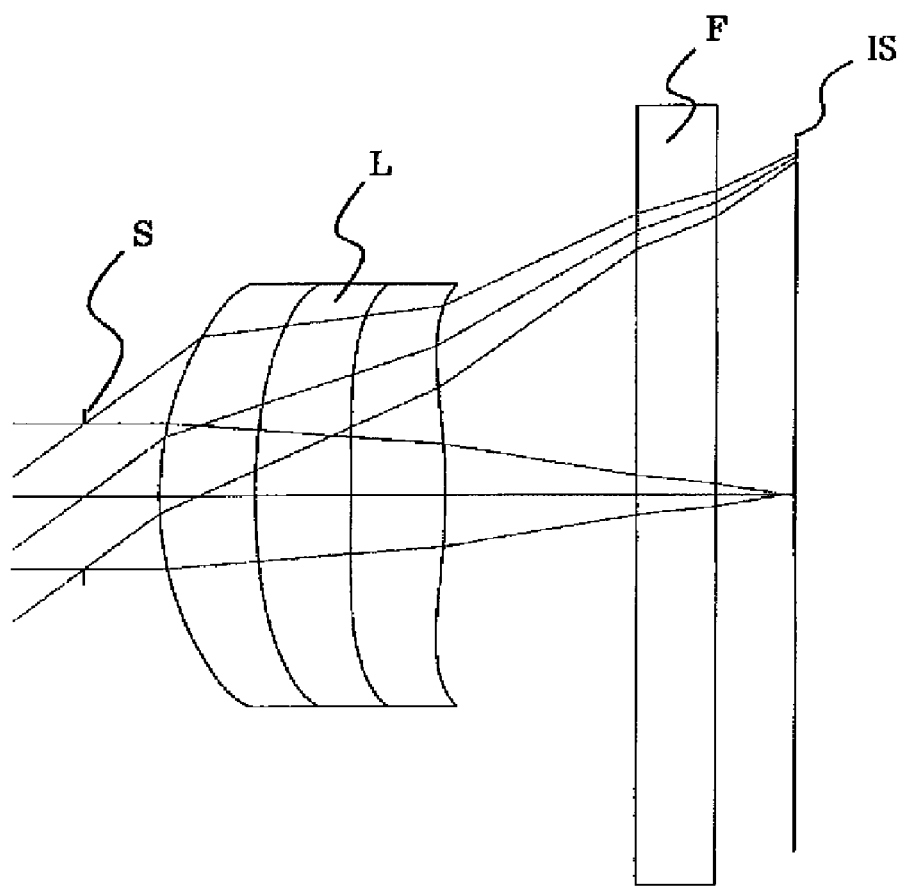
FIG. 8 is a cross-sectional view of Second Example.

In Second Example, lens surface distance was corrected in order to enhance the optical property of Comparative Example 2 and to bring the optical performance to the that of Comparative Example 1. FIG. 8 shows a cross-sectional view of the image pickup lens shown in Second Example.

Comparative Example 3

Table 6 shows data of a pair of lenses under the assumption that the thermosetting resin is a homogeneous resin with refractive index $n_1$, as Comparative Example 3. An image pickup element had the following specification: 1/10 inch type, 2.2 μm pixel pitch, 640×480 pixels. A distance between the surface closest to the image and the image pickup element was defined as a best focus distance along the optical axis of MTF (Modulation Transfer Function) when spatial frequency is set to 113 lines/mm, and the wavelength ratio "d-line:F-line:C-line" is 1:1:1. When the lenses are defined as a first lens and a second lens in order from the object side, the second lens is a lens molded with the thermosetting resin, and the first lens is a glass mold lens formed out of the material L-BSL 7 made of OHARA Inc.

TABLE 6 f = 1.334 mm fB = 0.263 mm F = 2.88 2Y = 1.76 mm
ENTP = 0 mm EXTP = −1.88 mm H1 = −0.5 mm H2 = −1.07 mm

| Surface No. | r(mm) | D(mm) | Nd | vd | Effective radius (mm) |
|---|---|---|---|---|---|
| 1 (Stop) | ∞ | 0.1300 | | | 0.232 |
| 2* | 1.7986 | 0.5600 | 1.51630 | 64.1 | 0.342 |
| 3* | 5.1974 | 0.2300 | | | 0.504 |
| 4* | 0.6601 | 0.4700 | 1.52568 | 53.8 | 0.626 |
| 5* | 2.4568 | 0.3135 | | | 0.688 |
| 6 | ∞ | 0.3000 | 1.51680 | 64.2 | 0.747 |
| 7 | ∞ | 0.2000 | | | 0.824 |

Aspheric surface coefficient

| $2^{nd}$ surface | | $4^{th}$ surface | |
|---|---|---|---|
| K = | 3.1019e+00 | K = | −8.4433e−01 |
| A4 = | −1.8389e−02 | A4 = | −5.6886e−01 |
| A6 = | −7.0515e+00 | A6 = | 3.1415e−01 |
| A8 = | 4.0775e+01 | A8 = | −2.8842e+00 |
| A10 = | −8.5370e+01 | A10 = | 5.0788e+00 |
| A12 = | −3.1382e+01 | A12 = | 2.0040e+00 |
| | | A14 = | −1.9446e+01 |
| $3^{rd}$ surface | | $5^{th}$ surface | |
| K = | 1.7691e+01 | K = | 3.8504e+00 |
| A4 = | −2.3983e+00 | A4 = | 1.2925e+00 |
| A6 = | 9.0173e+00 | A6 = | −2.8972e+00 |
| A8 = | −2.3407e+01 | A8 = | 7.9198e−01 |
| A10 = | −5.5225e+00 | A10 = | 2.9917e+00 |
| A12 = | 7.3214e+01 | A12 = | −3.2534e+00 |
| | | A14 = | 5.5542e−01 |

Figure 9:
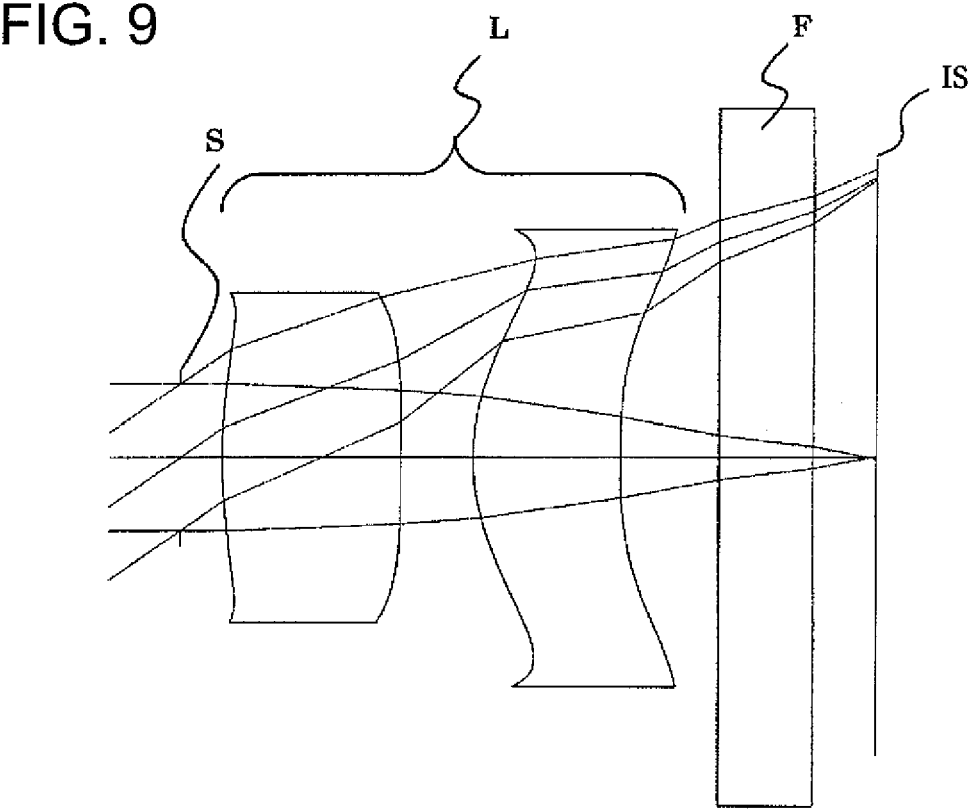
FIG. 9 is a cross-sectional view of Comparative Example 3.

FIG. 9 shows a cross-sectional view of the image pickup lens shown in Comparative Example 3. Third Example is aimed to bring its optical performance close to that of Comparative Example 3.

Comparative Example 4

Table 7 shows lens data under a condition that refractive index difference is caused inside the lens of the Comparative Example 3 and a lens with refractive index $n_2$ exists therein, as Comparative Example 4. The lens was calculated by fitting with the Expression 1 under the condition that the surface closest to the object and the surface closest to the image in the outer layer portions had the same lens shapes as those of Comparative Example 3, the lens shape of the central portion (inner portion) had a one-third thickness along the optical axis of that of the lens in Comparative Example 3, and its surface shape satisfied the ratio "thickness of the outer layer portion":"thickness of the central portion (inner portion)": "thickness of the outer layer portion" to be 1:1:1 at every optical axis height y based on the surface shape of the opposing surfaces of the outer layer portions as a basis.

TABLE 7 f = 1.332 mm fB = 0.262 mm F = 2.88 2Y = 1.76 mm
ENTP = 0 mm EXTP = −1.88 mm H1 = −0.5 mm H2 = −1.07 mm

| Surface No. | r(mm) | D(mm) | Nd | vd | Effective radius (mm) |
|---|---|---|---|---|---|
| 1 (Stop) | ∞ | 0.1300 | | | 0.231 |
| 2* | 1.7986 | 0.5600 | 1.51630 | 64.1 | 0.342 |
| 3* | 5.1974 | 0.2300 | | | 0.504 |
| 4* | 0.6601 | 0.1567 | 1.52568 | 53.8 | 0.626 |
| 5* | 0.8729 | 0.1566 | 1.52820 | 53.8 | 0.646 |
| 6* | 1.2872 | 0.1567 | 1.52568 | 53.8 | 0.666 |
| 7* | 2.4568 | 0.3135 | | | 0.688 |
| 8 | ∞ | 0.3000 | 1.51680 | 64.2 | 0.747 |
| 9 | ∞ | 0.2000 | | | 0.824 |

Aspheric surface coefficient

| $2^{nd}$ surface | | $5^{th}$ surface | |
|---|---|---|---|
| K = | 3.1019e+00 | K = | −4.5173e−01 |
| A4 = | −1.8389e−02 | A4 = | 7.2881e−03 |
| A6 = | −7.0515e+00 | A6 = | −7.7992e−01 |
| A8 = | 4.0775e+01 | A8 = | −1.6703e+00 |
| A10 = | −8.5370e+01 | A10 = | 4.3742e+00 |
| A12 = | −3.1382e+01 | A12 = | 2.5343e−01 |
| | | A14 = | −1.2786e+01 |
| $3^{rd}$ surface | | $6^{th}$ surface | |
| K = | 1.7691e+01 | K = | 1.2193e+00 |
| A4 = | −2.3983e+00 | A4 = | 5.8217e−01 |
| A6 = | 9.0173e+00 | A6 = | −1.7919e+00 |
| A8 = | −2.3407e+01 | A8 = | −1.0353e+00 |
| A10 = | −5.5225e+00 | A10 = | 4.9020e+00 |
| A12 = | 7.3214e+01 | A12 = | −2.8693e+00 |
| | | A14 = | −5.9302e+00 |
| $4^{th}$ surface | | $7^{th}$ surface | |
| K = | −8.4433e−01 | K = | 3.8504e+00 |
| A4 = | −5.6886e−01 | A4 = | 1.2925e+00 |
| A6 = | 3.1415e−01 | A6 = | −2.8972e+00 |
| A8 = | −2.8842e+00 | A8 = | 7.9198e−01 |
| A10 = | 5.0788e+00 | A10 = | 2.9917e+00 |
| A12 = | 2.0040e+00 | A12 = | −3.2534e+00 |
| A14 = | −1.9446e+01 | A14 = | 5.5542e−01 |

Figure 10:
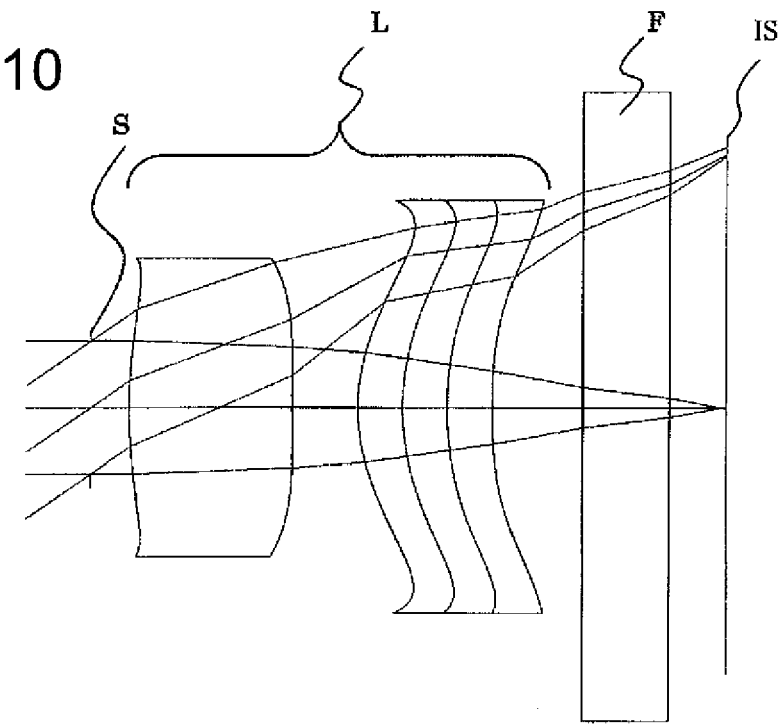
FIG. 10 is a cross-sectional view of Comparative Example 4.

FIG. 10 shows a cross-sectional view of the image pickup lens shown in Comparative Example 4. Comparative Example 4 provides an image pickup lens which is an assumed object of comparison in the design method of claim 1. The following Third Example was designed by carrying out a correction based on simulation data of Comparative Example 3 and Comparative Example 4.

Third Example

Table 8 shows lens data provided by changing curvature radiuses and thickness along the optical axis of the first lens and respective lens distances in data of Comparative Example 4, as Third Example. Surface shape and thickness along the optical axis of the second lens were assumed to be the same as those in Comparative Example 4.

TABLE 8 f = 1.334 mm fB = 0.262 mm F = 2.88 2Y = 1.76 mm
ENTP = 0 mm EXTP = −1.86 mm H1 = −0.5 mm H2 = −1.07 mm

| Surface No. | r(mm) | D(mm) | Nd | vd | Effective radius (mm) |
|---|---|---|---|---|---|
| 1 (Stop) | ∞ | 0.1300 | | | 0.232 |
| 2* | 1.7659 | 0.5489 | 1.51630 | 64.1 | 0.343 |
| 3* | 4.8482 | 0.2303 | | | 0.501 |
| 4* | 0.6601 | 0.1567 | 1.52568 | 53.8 | 0.624 |
| 5* | 0.8729 | 0.1566 | 1.52820 | 53.8 | 0.644 |
| 6* | 1.2872 | 0.1567 | 1.52568 | 53.8 | 0.664 |
| 7* | 2.4568 | 0.3148 | | | 0.685 |
| 8 | ∞ | 0.3000 | 1.51680 | 64.2 | 0.745 |
| 9 | ∞ | 0.2000 | | | 0.822 |

Aspheric surface coefficient

| $2^{nd}$ surface | | $5^{th}$ surface | |
|---|---|---|---|
| K = | 3.1019e+00 | K = | −4.5173e−01 |
| A4 = | −1.8389e−02 | A4 = | 7.2881e−03 |
| A6 = | −7.0515e+00 | A6 = | −7.7992e−01 |
| A8 = | 4.0775e+01 | A8 = | −1.6703e+00 |
| A10 = | −8.5370e+01 | A10 = | 4.3742e+00 |
| A12 = | −3.1382e+01 | A12 = | 2.5343e−01 |
| | | A14 = | −1.2786e+01 |
| $3^{rd}$ surface | | $6^{th}$ surface | |
| K = | 1.7691e+01 | K = | 1.2193e+00 |
| A4 = | −2.3983e+00 | A4 = | 5.8217e−01 |
| A6 = | 9.0173e+00 | A6 = | −1.7919e+00 |
| A8 = | −2.3407e+01 | A8 = | −1.0353e+00 |
| A10 = | −5.5225e+00 | A10 = | 4.9020e+00 |
| A12 = | 7.3214e+01 | A12 = | −2.8693e+00 |
| | | A14 = | −5.9302e+00 |
| $4^{th}$ surface | | $7^{th}$ surface | |
| K = | −8.4433e−01 | K = | 3.8504e+00 |
| A4 = | −5.6886e−01 | A4 = | 1.2925e+00 |
| A6 = | 3.1415e−01 | A6 = | −2.8972e+00 |
| A8 = | −2.8842e+00 | A8 = | 7.9198e−01 |
| A10 = | 5.0788e+00 | A10 = | 2.9917e+00 |
| A12 = | 2.0040e+00 | A12 = | −3.2534e+00 |
| A14 = | −1.9446e+01 | A14 = | 5.5542e−01 |

Figure 11:
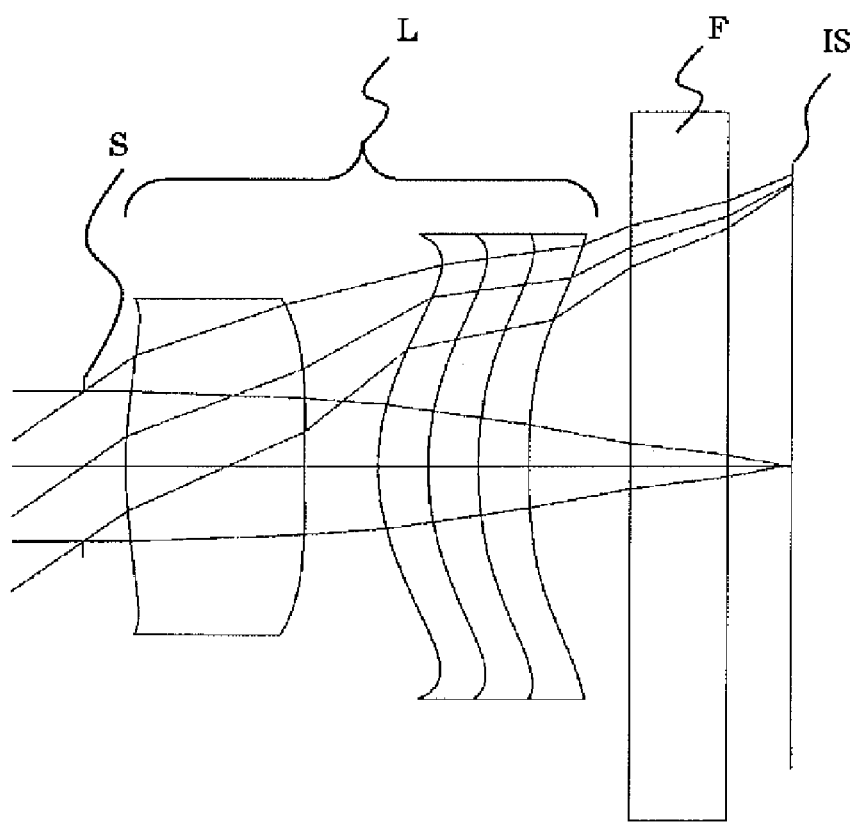
FIG. 11 is a cross-sectional view of Third Example.

In Third Example, the surface shape and surface distances of the lens was corrected to enhance the optical performance of Comparative Example 4 and to bring the optical performance close to that of Comparative Example 3. In the present example, the correction was carried out by changing the surface shape and surface distance of the first lens instead of changing shape of the lens formed of thermosetting resin. FIG. 11 shows a cross-sectional view of the image pickup lens shown in Third Example.

As a method of evaluating respective Comparative Examples and Examples, MTF simulation was carried out based on the lens data. As the simulation condition, the followings were provided: 50 lines/mm of spatial frequency, the wavelengths ratio of d line, F line, and C line being 1:1:1, and image heights defined at a position of on-axis, three-tenths, five-tenths, seven-tenths, and ten-tenths, where the diagonal length was assumed to be 1.

As for a single lens, assuming that Comparative Example 1 was the basis for evaluation, a quantity of deterioration of MTF of Comparative Example 2, First Example, and Second Example were simulated. As for a pair of lenses, assuming that Comparative Example 3 was the basis for evaluation, a quantity of deterioration of MTF of Comparative Example 4, and Third Example were simulated. The distance from the surface closest to the image in the image pickup lens to the image pickup element was fixed to an on-axis best-focus distance of the lens as the basis for evaluation. Among the quantities of deterioration of MTF for the saggital surface and the meridional surface, one of greater deterioration was employed, and it was defined that a plus value means that the deterioration was enhanced both for the saggital surface and the meridional surface. Table 9 shows these results.

TABLE 9

| Comparative Example/Example | Quantity of MTF deterioration | | | | |
|---|---|---|---|---|---|
| | On axis | Three-tenths image height | Five-tenths image height | Seven-tenths image height | ten-tenths image height |
| Comparative Example 1 (Basis) | — | — | — | — | — |
| Comparative Example 2 | −0.5% | −1.2% | −1.8% | −1.2% | −0.2% |
| First Example | ±0.0% | −0.1% | −0.3% | −0.5% | −0.3% |
| Second Example | +0.1% | +0.1% | +0.1% | −0.1% | +0.1% |
| Comparative Example 3 (Basis) | — | — | — | — | — |
| Comparative Example 4 | −0.3% | −0.6% | −0.7% | −0.7% | −0.4% |
| Third Example | −0.3% | −0.3% | −0.2% | −0.9% | +0.9% |

As for the single lens, Table 9 shows that, compared with Comparative Example 1 in which the refractive index of the image pickup lens was assumed to be homogeneous, the MTF deterioration of Comparative Example 1 in which the refractive index was uneven between the outer layer portion and the inner portion was 1.8% at its maximum, and the MU deterioration of First Example and Second Example were 0.5% and 0.1% at their maximum, respectively, which are smaller than that of the Comparative Example 2. As for the pair of lenses, the effect on the axis is small and the performance at seven-tenths image height is slightly deteriorated, but the performance at each of three-tenths, five-tenths, and ten-tenths image heights is enhanced. As can be seen from the results, it has been found that the correction of the present invention is valuable as a method of controlling influence of unevenness of refractive index of a lens formed of thermosetting resin.

Figure 12:
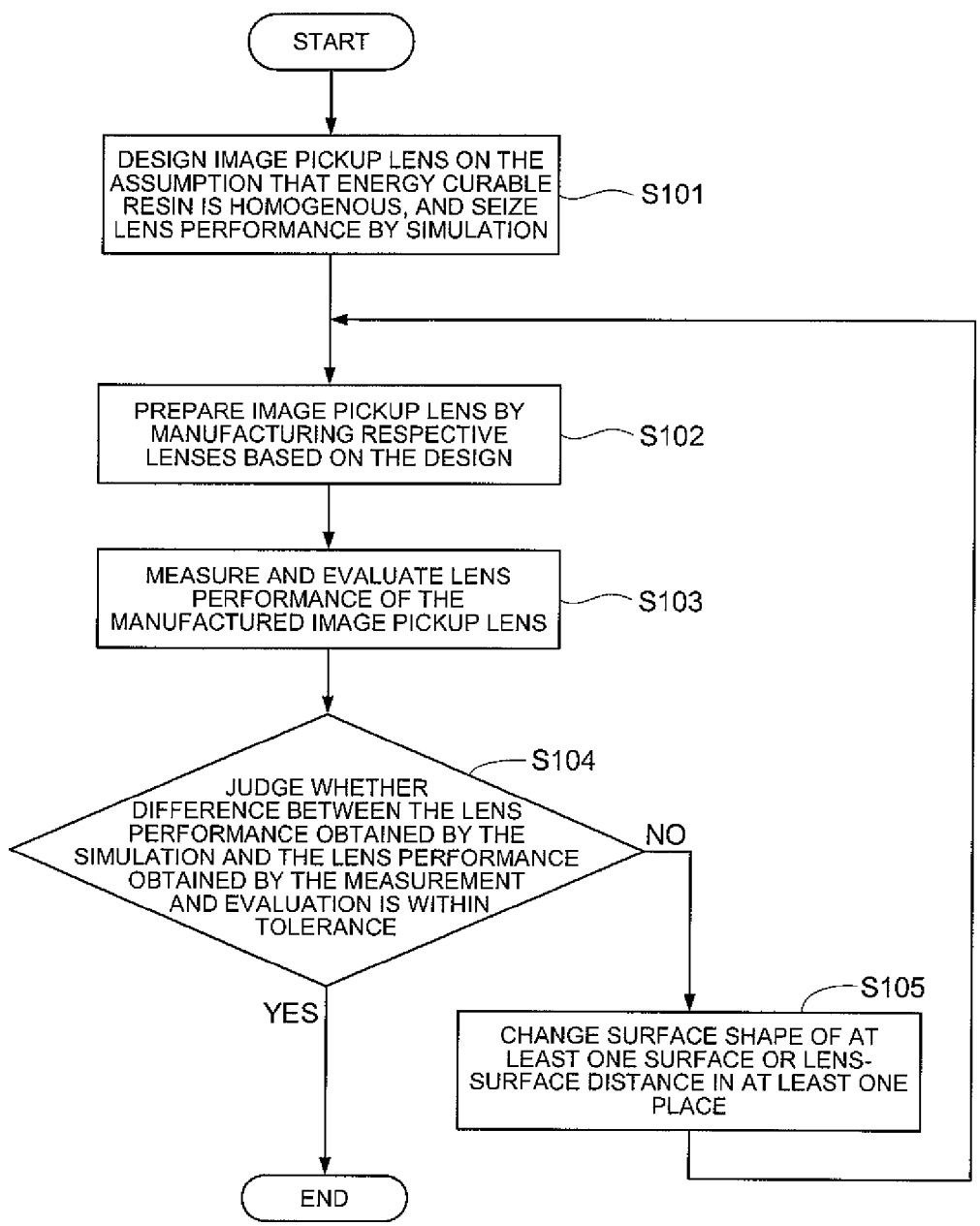
FIG. 12 is a flow chart for illustrating a method of designing a lens.

Alternatively, after the lens is designed on the assumption that the refractive index of the resin is homogeneous and actual image pickup lens is manufactured, the optical performance of the image pickup lens may be measured and the image pickup lens may be designed again using the feedback of the measurement result More concretely, as shown in FIG. 12, an image pickup lens is designed on the assumption that energy curable resin is homogeneous and the lens performance of the lens is seized by a simulation, in Step S101. Next, in Step S102, respective lenses forming the image pickup lens are actually manufactured based on the above design, and the performance of the manufactured image pickup lens is measured and evaluated in Step S103. Further, the lens performance obtained by the simulation in the designing step and the lens performance obtained by the measurement and evaluation are compared and it is judged that the difference is within a tolerance, in Step S104. When the difference exceeds the tolerance (Step S104; No), the image pickup lens is designed again by changing surface shape of at least one surface in the image pickup lens and/or changing lens-surface distance in at least one place in the image pickup lens, in Step S105. Then, the operation returns to Step S102, and steps S102 to S104 are repeated again based on the next design. On the other hand, when the lens performance of the image pickup lens obtained by the measurement and evaluation is in the tolerance, compared with the lens performance obtained by the simulation in the designing step (Step S104; Yes), the design is completed.

When the lens formed of energy curable resin has a structure including plural layers whose refractive indexes are different from each other because of non-homogeneity, and when the outline of the structure is estimated in advance, the image pickup lens may be designed while the lens formed of energy curable resin is compared with a lens having the same shape as the lens formed of energy curable resin and has a homogeneous refractive index using a simulation.

More concretely, as shown in FIG. 13, an image pickup lens is designed on the assumption that energy curable resin is homogeneous and the lens performance of the lens is seized by a simulation, in Step S201. Next, in Step S202, a lens formed of energy curable resin is designed as a lens having a stricture including a plurality of layers whose refractive indexes are different from each other because of non-homogeneity, the lens is compared with the lens obtained in Step S201 in terms of lens performance, and the difference is brought within the tolerance, to complete the design.

A term "within the tolerance" described in the flowcharts of FIGS. 12 and 13 means the situation that the difference in optical performance is in a tolerable range, and also means the situation that the optical performance exceeds the lens performance as a basis obtained in Step S101 (in FIG. 12) and Step S201 (in FIG. 13).

The above embodiments and examples were described by using a lens formed of energy curable resin, which is considered as three-layer structure, but the scope of the invention is not limited to it. When the lens is considered as a multilayered structure with more than three layers, it can be naturally designed suitably to the number of layers.

The invention claimed is:

1. A method for designing an image pickup lens including at least one lens formed of a material with non-homogeneity, for forming a subject image on an photoelectric conversion section of a solid-state image pickup element, the method comprising the steps of:
    assuming that the lens formed of the material with non-homogeneity is a lens having a structure including a plurality of layers whose refractive indexes are different from each other because of the non-homogeneity, the plurality of layers being piled up in a thickness direction of the lens; and
    designing a shape of at least one of (i) at least one surface of the image pickup lens and (ii) a lens-surface distance in at least one place of the image pickup lens, based on a comparison between the assumed lens and a lens having a same shape to the lens formed of the material with non-homogeneity resin and having a homogenous refractive index.

2. The method of claim 1, wherein the at least one lens formed of a material with non-homogeneity is at least one lens formed of energy curable resin, and the method further comprises the steps of:

assuming that the lens formed of the energy curable resin is a lens having a structure including a plurality of layers whose refractive indexes are different from each other because of non-homogeneity of the energy curable resin, the plurality of layers being piled up in a thickness direction of the lens; and designing a shape of at least one of: (i) at least one surface of the image pickup lens and (ii) a lens-surface distance in at least one place of the image pickup lens, based on a comparison between the assumed lens and a lens having a same shape to the lens formed of the energy curable resin and having a homogenous refractive index.

3. The method of claim 2, wherein the lens formed of the energy curable resin has a thickness along an optical axis of 1 mm or less.

4. The method of claim 2, wherein the non-homogeneity of the energy curable resin is non-homogeneity in a refractive index.

5. An image pickup lens for forming a subject image on a photoelectrical converting section of a solid-state image pickup element, the image pickup lens comprising:

at least one lens formed of a material with non-homogeneity;

wherein a deterioration of a lens performance caused because of the non-homogeneity is corrected by assuming that the lens formed of the material with non-homogeneity is a lens having a structure including a plurality of layers whose refractive indexes are different from each other because of the non-homogeneity, the plurality of layers being piled up in a thickness direction of the lens; and designing a shape of at least one of (i) at least one surface of the image pickup lens and (ii) a lens-surface distance in at least one place of the image pickup lens, based on a comparison between the assumed lens and a lens having a same shape to the lens formed of the material with non-homogeneity and having a homogenous refractive index.

6. The image pickup lens of claim 5, wherein the at least one lens formed of the material with non-homogeneity is at least one lens formed of an energy curable resin, and wherein a deterioration of a lens performance caused because of non-homogeneity of the energy curable resin, is corrected by assuming that the lens formed of the energy curable resin is a lens having a structure including a plurality of layers whose refractive indexes are different from each other because of the non-homogeneity of the energy curable resin, the plurality of layers being piled up in a thickness direction of the lens; and designing a shape of at least one of (i) at least one surface of the image pickup lens and (ii) a lens-surface distance in at least one place of the image pickup lens, based on a comparison between the assumed lens and a lens having a same shape to the lens formed of the energy curable resin and having a homogenous refractive index.

7. The image pickup lens of claim 6, wherein the lens formed of the energy curable resin has a thickness along an optical axis of 1 mm or less.

8. The image pickup lens of claim 6, wherein the non-homogeneity of the energy curable resin is non-homogeneous in a refractive index.

* * * * *